United States Patent
Liu et al.

(10) Patent No.: US 11,416,272 B2
(45) Date of Patent: Aug. 16, 2022

(54) METHODS, BLOCKCHAIN NODES, SYSTEMS AND STORAGE MEDIA FOR EXECUTING SMART CONTRACT

(71) Applicant: ALIPAY (HANGZHOU) INFORMATION TECHNOLOGY CO., LTD., Zhejiang (CN)

(72) Inventors: Qi Liu, Hangzhou (CN); Xuepeng Guo, Hangzhou (CN)

(73) Assignee: Alipay (Hangzhou) Information Technology Co., Ltd.

( * ) Notice: Subject to any disclaimer, the term of this patent is extended or adjusted under 35 U.S.C. 154(b) by 0 days.

(21) Appl. No.: 17/362,921

(22) Filed: Jun. 29, 2021

(65) Prior Publication Data

US 2021/0326158 A1  Oct. 21, 2021

(30) Foreign Application Priority Data

Aug. 31, 2020  (CN) .......................... 202010901436.3

(51) Int. Cl.
*G06F 9/45* (2006.01)
*G06F 9/455* (2018.01)
*G06F 9/445* (2018.01)

(52) U.S. Cl.
CPC ........ *G06F 9/4552* (2013.01); *G06F 9/44589* (2013.01); *G06F 9/45508* (2013.01); *G06F 9/45525* (2013.01)

(58) Field of Classification Search
CPC .............. G06F 9/4552; G06F 9/44589; G06F 9/45508; G06F 9/45525

(Continued)

(56) References Cited

U.S. PATENT DOCUMENTS 9,134,978 B1 * 9/2015 Roskind ................... G06F 8/443
10,509,919 B1 * 12/2019 Wang ................... G06Q 20/401

(Continued)

FOREIGN PATENT DOCUMENTS

CN 106484375 3/2017
CN 108536514 9/2018

(Continued)

OTHER PUBLICATIONS

Title: Blockchain and Trade Finance: A Smart Contract-Based Solution, author: A Blum published on 2019.*

(Continued)

*Primary Examiner* — Chameli Das
(74) *Attorney, Agent, or Firm* — Fish & Richardson P.C.

(57) ABSTRACT

Computer-implemented methods, non-transitory, computer-readable media, and computer-implemented systems are provided for executing a smart contract in a blockchain network. A computer-implemented method includes: in response to determining that bytecodes of a smart contract are deployed on a first blockchain node in a blockchain network, starting, by the first blockchain node, to compile the bytecodes of the smart contract into machine codes of the smart contract through a Just-In-Time (JIT) compiler; determining, by the first blockchain node, that the machine codes of the smart contract are not locally stored and that execution results of the machine codes of the smart contract and the bytecodes of the smart contract are consistent; and in response to the determining, performing, by the first blockchain node, interpretation execution on the bytecodes of the smart contract.

25 Claims, 9 Drawing Sheets

(58) Field of Classification Search
USPC .......................................................... 717/148
See application file for complete search history.

(56) References Cited

U.S. PATENT DOCUMENTS

| | | | | |
|---|---|---|---|---|
| 10,616,324 | B1* | 4/2020 | Kaddoura | H04L 69/329 |
| 11,036,614 | B1* | 6/2021 | Huang | H04L 9/3239 |
| 11,086,847 | B2* | 8/2021 | Sun | G06F 16/2365 |
| 2007/0226714 | A1* | 9/2007 | Doi | G06F 9/45504 |
| | | | | 717/148 |
| 2017/0232300 | A1* | 8/2017 | Tran | H04L 67/10 |
| | | | | 434/247 |
| 2019/0026828 | A1* | 1/2019 | Preston | G06Q 40/04 |
| 2019/0058709 | A1* | 2/2019 | Kempf | H04L 9/3226 |
| 2019/0065709 | A1 | 2/2019 | Salomon | |
| 2020/0174937 | A1 | 6/2020 | Yao | |
| 2020/0225968 | A1* | 7/2020 | Ferraro | G06F 9/455 |
| 2020/0250663 | A1* | 8/2020 | Abad | H04L 9/3239 |
| 2021/0064784 | A1* | 3/2021 | Wei | G06F 21/602 |
| 2021/0150046 | A1* | 5/2021 | Xiao | H04L 9/08 |
| 2021/0150524 | A1* | 5/2021 | Yan | G06F 21/6218 |

FOREIGN PATENT DOCUMENTS

| | | |
|---|---|---|
| CN | 110032883 | 7/2019 |
| CN | 110096338 | 8/2019 |
| CN | 110249307 | 9/2019 |
| CN | 110688122 | 1/2020 |
| CN | 110704063 | 1/2020 |
| CN | 110704064 | 1/2020 |
| CN | 111033544 | 4/2020 |
| CN | 111061484 | 4/2020 |
| CN | 111399990 | 7/2020 |
| CN | 111538521 | 8/2020 |
| WO | WO 2019116184 | 6/2019 |

OTHER PUBLICATIONS

Title: Towards verifying ethereum smart contract bytecode in Isabelle/HOL, author: S Amani, published on 2018.*
Title: Detecting ponzi schemes on ethereum: Towards healthier blockchain technology, author: W Chen, published on 2018.*
Title: Gigahorse: thorough, declarative decompilation of smart contracts, author: N Grech, published on 2019.*
Brown [online], "EOS 2.0 Announced With Multi-threading and EOS VM JIT Compiler," Oct. 7, 2019, retrieved on or before Jul. 7, 2021, retrieved from URL<https://www.kompulsa.com/2019/10/07/eos-2-0-released-with-multi-threading-and-eos-vm-jit-compiler/>, 5 pages.
Crosby et al., "BlockChain Technology: Beyond Bitcoin," Sutardja Center for Entrepreneurship & Technology Technical Report, Oct. 16, 2015, 35 pages.
Fan, "A Preliminary Study of Smart Contracts and Oracles," Information and Communication Technology and Policy, Jul. 15, 2018, 4 pages (with English abstract).
medium.com [online], "Ontology Wasm-JIT Released: A Leading Smart Contract Virtual Machine with High Speed and Performance," Mar. 12, 2020, retrieved on Jul. 7, 2021, retrieved from URL<https://medium.com/ontologynetwork/ontology-wasm-jit-released-a-leading-smart-contract-virtual-machine-with-high-speed-and-519783fe5055>, 4 pages.
Nakamoto, "Bitcoin: A Peer-to-Peer Electronic Cash System," www.bitcoin.org, 2005, 9 pages.
EP Extended Search Report in European Application No. 21182628.4, dated Dec. 12, 2021, 13 pages.
Wikipedia [online], "Just-in-time compilation", Mar. 10, 2009, retrieved on Jul. 18, 2012, retrieved from URL<http://en.wikipedia.org/w/index.php?title=Just-in-time compilation&oldid=276154029>, 4 pages.

* cited by examiner

METHODS, BLOCKCHAIN NODES, SYSTEMS AND STORAGE MEDIA FOR EXECUTING SMART CONTRACT

CROSS-REFERENCE TO RELATED APPLICATIONS

This application claims priority to Chinese Patent Application No. 202010901436.3, filed on Aug. 31, 2020, which is hereby incorporated by reference in its entirety.

TECHNICAL FIELD

The present disclosure relates to the field of blockchain technologies, and in particular to methods, blockchain nodes, systems and storage media for executing a smart contract.

BACKGROUND

Blockchain is a new application mode of computer technologies such as distributed data storage, peer-to-peer transmission, consensus mechanism and encryption algorithm and the like. The advent of smart contracts in the blockchain 2.0 era promotes the application scope of blockchain to a new level. With a smart contract, the blockchain can also invoke a segment of codes which can be user-defined in addition to executing transfer transactions.

SUMMARY

The present disclosure provides methods, blockchain nodes, systems and storage media for executing a smart contract.

The methods, blockchain nodes, systems and storage media for executing a smart contract provided by embodiments of the present disclosure can be implemented as below.

Provided is a method for executing a smart contract, including:

respectively receiving, by a first blockchain node and a second blockchain node, a request for creating the smart contract, wherein the request includes bytecodes of the smart contract;

after completing deployment of the smart contract, respectively starting, by the first blockchain node and the second blockchain node, to compile the bytecodes of the smart contract into machine codes through JIT Compiler and store the machine codes;

when executing the deployed smart contract, executing, by the first blockchain node, the machine codes if the machine codes of the smart contract are locally stored;

when executing the deployed smart contract, performing, by the second blockchain node, interpretation execution for the bytecodes in response to determining that execution results of the machine codes and the bytecodes of the smart contract are consistent if the machine codes of the smart contract are not locally stored.

Provided is a method for executing a smart contract, including:

after deploying bytecodes of the smart contract, respectively starting, by a first blockchain node and a second blockchain node, to compile the bytecodes of the smart contract into machine codes through JIT Compiler and store the machine codes;

when executing the deployed smart contract, executing, by the first blockchain node, the machine codes if the machine codes of the smart contract are locally stored;

when executing the deployed smart contract, performing, by the second blockchain node, interpretation execution for the bytecodes in response to determining that execution results of the machine codes and the bytecodes of the smart contract are consistent if the machine codes of the smart contract are not locally stored.

Provided is a blockchain system for executing a smart contract, including a first blockchain node and a second blockchain node, wherein the first blockchain node performs operations performed by the first blockchain node in the method as described above, and the second blockchain node performs operations performed by the second blockchain node in the method as described above.

Provided is a blockchain system for executing a smart contract, including:

a first blockchain node, including a processor and a memory storing programs thereon, where the programs are executed by the processor to perform operations performed by the first blockchain node in the method as described above;

a second blockchain node, including a processor and a memory storing programs thereon, where the programs are executed by the processor to perform operations performed by the second blockchain node in the method as described above.

Provided is a blockchain node for executing a smart contract, which performs operations performed by a first blockchain node and/or a second blockchain node in the method as described above.

Provided is a blockchain node for executing a smart contract, including:

a processor;

a memory storing programs thereon, where the programs are executed by the processor to perform operations performed by a first blockchain node and/or a second blockchain node in the method as described above.

Provided are storage media for storing programs, where the programs are executed to perform operations in the method as described above.

In the above-described embodiments of the present disclosure, in a case that the machine codes of the smart contract are stored, because the machine codes can be directly executed by a central processing unit (CPU), the first blockchain node can execute the smart contract at a significantly increased speed. However, in a case that a local compilation is not completed, the second blockchain node can perform interpretation execution for the bytecodes of the smart contract so that blockchain service requests can be processed normally while the local compilation is performed. Since different blockchain nodes can differ in processing performance and the like, different blockchain nodes can have different compilation progresses for a smart contract indicated by the same transaction during execution of the smart contract. In this case, in response to determining that the execution results of the machine codes and the bytecodes are consistent, the first blockchain node already completing compilation executes the machine codes and the second blockchain node which has not started compilation or has not completed compilation performs interpretation execution for the bytecodes. The first blockchain node does not need to wait for the second blockchain node to complete compilation operation, thereby helping to increase the execution efficiency of the smart contract.

BRIEF DESCRIPTION OF THE DRAWINGS

FIG. 6-1 is a flowchart of executing a smart contract according to one or more embodiments of the present disclosure.

FIG. 6-2 is a flowchart of executing a smart contract according to another embodiment of the present disclosure.

DESCRIPTION OF EMBODIMENTS

Figure 1:
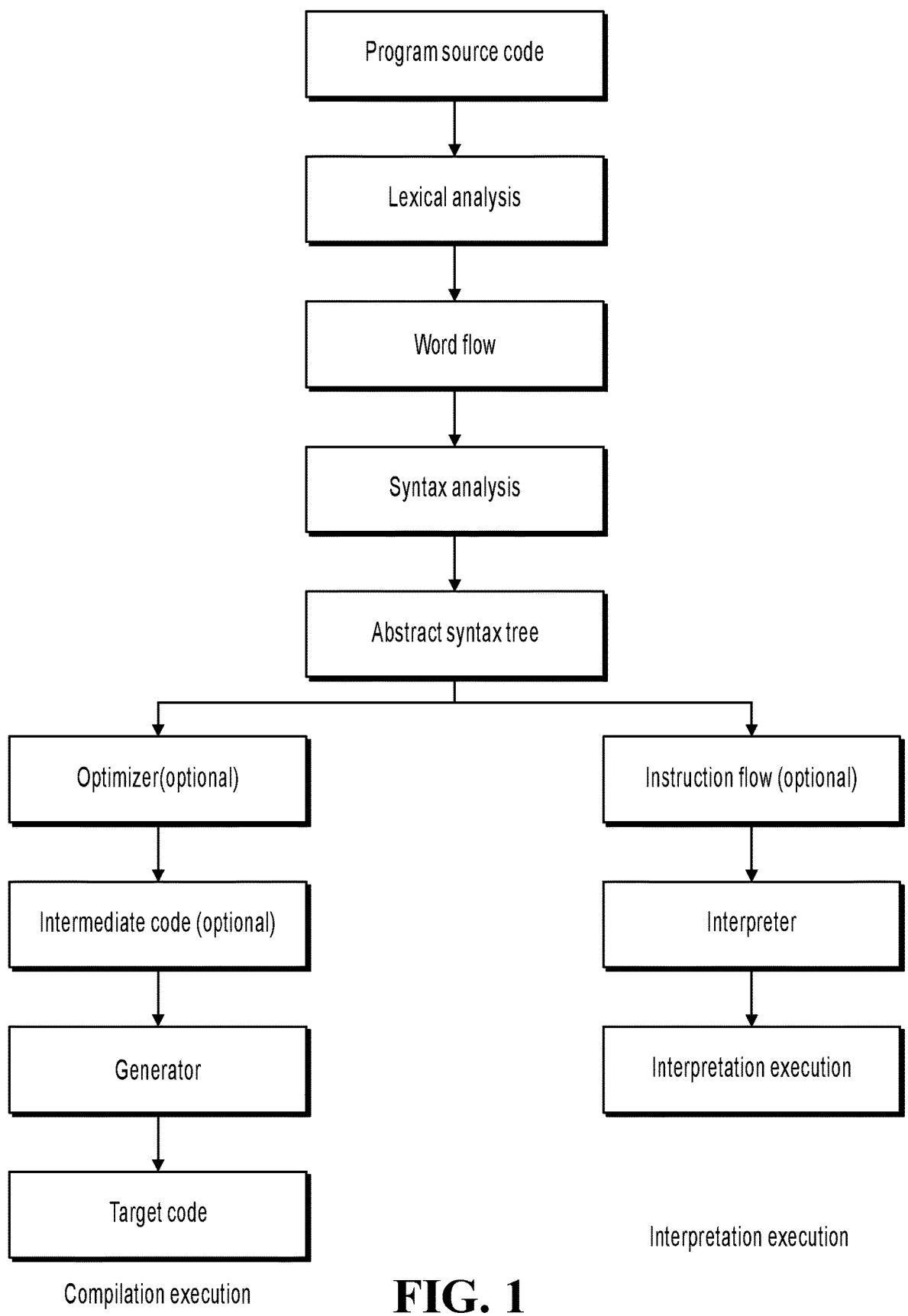
FIG. 1 is a schematic diagram of a principle of a compilation execution and an interpretation execution according to one or more embodiments of the present disclosure.

The example embodiments are described in detail herein, and the examples are shown in the drawings. When the following description refers to the drawings, unless otherwise indicated, the same numbers in different drawings indicate the same or similar elements. The embodiments described in the following example embodiments do not represent all embodiments consistent with one or more embodiments of the present specification. On the contrary, they are merely embodiments of apparatuses and methods consistent with some aspects of one or more embodiments of the present specification described in detail in the appended claims.

It should be noted that, in other embodiments, the steps of the corresponding method are not necessarily performed in the order shown and described herein. In some other embodiments, the method can include more or fewer steps than described herein. Moreover, a single step described in the present specification can be divided into multiple steps for description in other embodiments; and multiple steps described in the present specification can be combined into a single step for description in other embodiments.

The Blockchain 1.0 era usually refers to the development stage of blockchain applications represented by bitcoin between 2009 and 2014, and mainly focuses on solving the problem of decentralization of currency and payment means. Since 2014, developers have paid more and more attention on solving deficiencies of bitcoin in terms of technology and scalability. In late 2013, Vitalik Buterin released an Ethereum white paper, "Ethereum: A next-generation smart contract and decentralized application platform", which introduced smart contracts into blockchain and opened the application of the blockchain outside the monetary field, thus opening the era of Blockchain 2.0.

A smart contract is a computerized protocol that can be automatically executed based on specified trigger rules, and can also be regarded as a digital version of a traditional contract. The concept of smart contracts was first proposed in 1994 by Nick Szabo, an interdisciplinary legal scholar and cryptography researcher. This technology was once not used in the practical industry due to the lack of programmable digital systems and related technology until the emergence of blockchain technology and Ethereum which provided a secure execution environment. Due to a blockchain-type ledger adopted by the blockchain technology, generated data cannot be tampered with or deleted, and the entire ledger will continuously add ledger data, thus ensuring traceability of historical data; moreover, the decentralized operation mechanism avoids the influence of centralized factors. Smart contracts based on blockchain technology cannot only give full play to advantages of the smart contracts in terms of cost and efficiency, but also avoid interference of malicious acts on normal execution of contracts. The smart contract is written into the blockchain in a digital form, and the characteristics of the blockchain technology ensure that the whole process of storage, reading and execution is transparent, traceable and cannot be tampered with.

The smart contract is essentially a program that can be executed by a computer. Like computer programs widely used now, smart contracts can be written in high-level languages (such as C language, C++ language, etc.). A program code of a smart contract written in high-level languages can generally be converted into "a machine code" that can be recognized and run by a CPU of the computer through a "compiler", and then such machine code (or "microprocessor instruction") can be executed by the CPU. This mode is generally invoked "compilation execution".

The compilation execution is generally not scalable across platforms. Because there are different manufacturers, different brands and different generations of CPUs, instruction sets supported by these different CPUs are different in many cases, such as x86 instruction set, ARM instruction set, etc., and the instruction sets supported by CPUs of different generations but the same manufacturer and the same brand (such as different generations of Intel CPUs) are not exactly the same. Therefore, the same program code written in the same high-level language may be converted into different machine codes by compilers on different CPUs. Specifically, in a process of converting a program code written in high-level languages into a machine code, a compiler will optimize in combination with the characteristics of specific CPU instruction sets (such as vector instruction sets, etc.) to improve the speed of program execution, and such optimization is often related to specific CPU hardware. In this way, one of the same machine codes can be run on x86, but the another may not be run on ARM; even for the same x86 platform, with the passage of time, the instruction set is constantly enriched and extended, which leads to that machine codes run on different generations of x86 platforms are different. Moreover, because the execution of a machine code needs the CPU to be scheduled by an operating system kernel, even with the same hardware, the machine code supported to be run under different operating systems may be different.

Different from the compilation execution, there is also a program operation mode of "interpretation execution". For example, the JAVA language compiles a JAVA source code into a standard bytecode through a JAVA compiler, where the compiler is not aimed at an instruction set of any actual hardware processor, but defines a set of abstract standard instruction sets. The compiled standard bytecode generally cannot run directly on the hardware CPU, so a virtual machine, namely JVM, is introduced, which runs on a specific hardware processor to interpret and execute the compiled standard bytecode.

JVM is an abbreviation of JAVA Virtual Machine, which is a kind of fictional computer, and usually can be realized by simulating various computer functions on actual computers. JVM shields information related to specific hardware platforms, operating systems, etc., so that JAVA programs can be run on a plurality of platforms without modification by only generating a standard bytecode that can be run on JAVA virtual machines.

A very important feature of the JAVA language is platform irrelevance. And using the JAVA virtual machines is the key to realize this feature. If a general high-level language is to be run on different platforms, at least it needs to be compiled into different target codes. After the introduction of the JAVA language virtual machine, the JAVA language does not need to be recompiled when it is run on different platforms. The JAVA language shields information related to specific platforms by using the JAVA virtual machine, so that a JAVA language compiler program can be run on various platforms without modification by generating only the target codes (bytecodes) run on the JVM. When the JAVA virtual machine executes the bytecode, the JAVA virtual machine interprets the bytecode as a machine instruction on a specific platform to execute. This is why JAVA can be written once and run anywhere.

JVM runs on a specific hardware processor and is responsible for interpreting and executing a bytecode for the specific processor run by the JVM, shielding these underlying differences upward and presenting to developers with standard development specifications. When the JVM executes a bytecode, the JVM actually finally interprets the bytecode as a machine instruction on a specific platform to execute. Specifically, after receiving an input bytecode, the JVM interprets each instruction in the bytecode statement by statement and translates the instruction into a machine code suitable for the current machine to run. These processes are interpreted and executed by an Interpreter for example. In this way, developers who write JAVA programs do not need to consider which kind of hardware platform the written program code will be run on. The development of the JVM is accomplished by professional developers in JAVA organization to adapt the JVM to different processor architectures. Up to now, there are only a limited number of mainstream processor architectures, such as X86, ARM, RISC-V, and MIPS. After professional developers respectively port the JVM to platforms that support the specific hardware, JAVA programs can theoretically be run on all machines. The porting of the JVM is usually provided by professionals in JAVA development organization, which greatly reduces the burden on JAVA application developers.

The interpretation execution brings cross-platform portability, but because the execution of a bytecode goes through the process of JVM intermediate translation, the execution efficiency is not as high as the compilation execution efficiency, and the difference in efficiency can sometimes even reach dozens of times.

FIG. 1 shows similarities and differences between compilation execution and interpretation execution. Both interpretation execution and compilation execution, or both a physical machine and a virtual machine, it is impossible for a machine to read and understand an application program like a human, and then acquire the ability to execute. Most of program codes, before becoming into the target codes of the physical machine or an instruction set which can be executed by the virtual machine, need to go through all the steps in FIG. 1. In FIG. 1, the branch from the top to the left is a generation process from a program code to a target machine code in traditional compilation principle, and the branch from the top to the right is a process of interpretation execution. Nowadays, most languages based on physical machines, JAVA virtual machines, or other High-Level Language Virtual Machines (HLLVMs) that are not JAVA will follow this idea based on modern classical compilation principles. Before execution, the program source code is processed with lexical analysis and syntax analysis to convert the source code into an Abstract Syntax Tree (AST). For the implementation of a specific language, lexical analysis, syntax analysis and even the following optimizer and target code generator can be selected to be independent of an execution engine to form a complete compiler to implement, which is represented by C or C++ language. Or, some of these steps (such as those steps before generating the AST) can be chosen to implement as a semi-independent compiler, which is represented by JAVA language. Or all these steps and the execution engine are concentrated encapsulated in a closed black box, such as most JAVASCRIPT executors.

In order to balance cross-platform portability and high performance as much as possible, the concept of Just-In-Time (JIT) Compiler was proposed. The core idea of the JIT Compiler is "how to efficiently avoid repetitive work of interpreting instructions". There are a large number of repeatedly executed codes in computer programs. For example, some computing "functions" may be invoked many times in a loop during the execution of a program. If it is interpretation execution, each execution of the loop process will translate this function from a bytecode to a machine code. However, the actual situation is that the machine code generated by this function in dozens of translations is exactly the same. Naturally, after the first translation, the machine code of the translated function is cached. In the subsequent re-execution process, the cached code is directly used without being repeatedly translated, which can improve the execution efficiency.

On the contrary, some functions are executed only once during a program running cycle (for example, boot initialization), then such functions do not need to be cached and can be directly interpretation executed once. Therefore, a core module in JIT Compiler technology is "hotspot analysis", that is, by analyzing which codes have been executed many times in the process of program execution, so as to cache translated machine codes. For operations with a less number of execution times, caching is not needed. In this way, a best balance between execution efficiency and memory overhead can be achieved.

In addition, another core module in the JIT Compiler technology is compilation optimization (or optimizing compilation). Directly translated machine codes are not optimized in conjunction with the context, and only high-frequency machine codes are cached, which is limited in performance improvement. For better performance, further optimizations can be made to a compiler. The method for compilation optimization generally takes relatively more time to implement.

Figure 2:
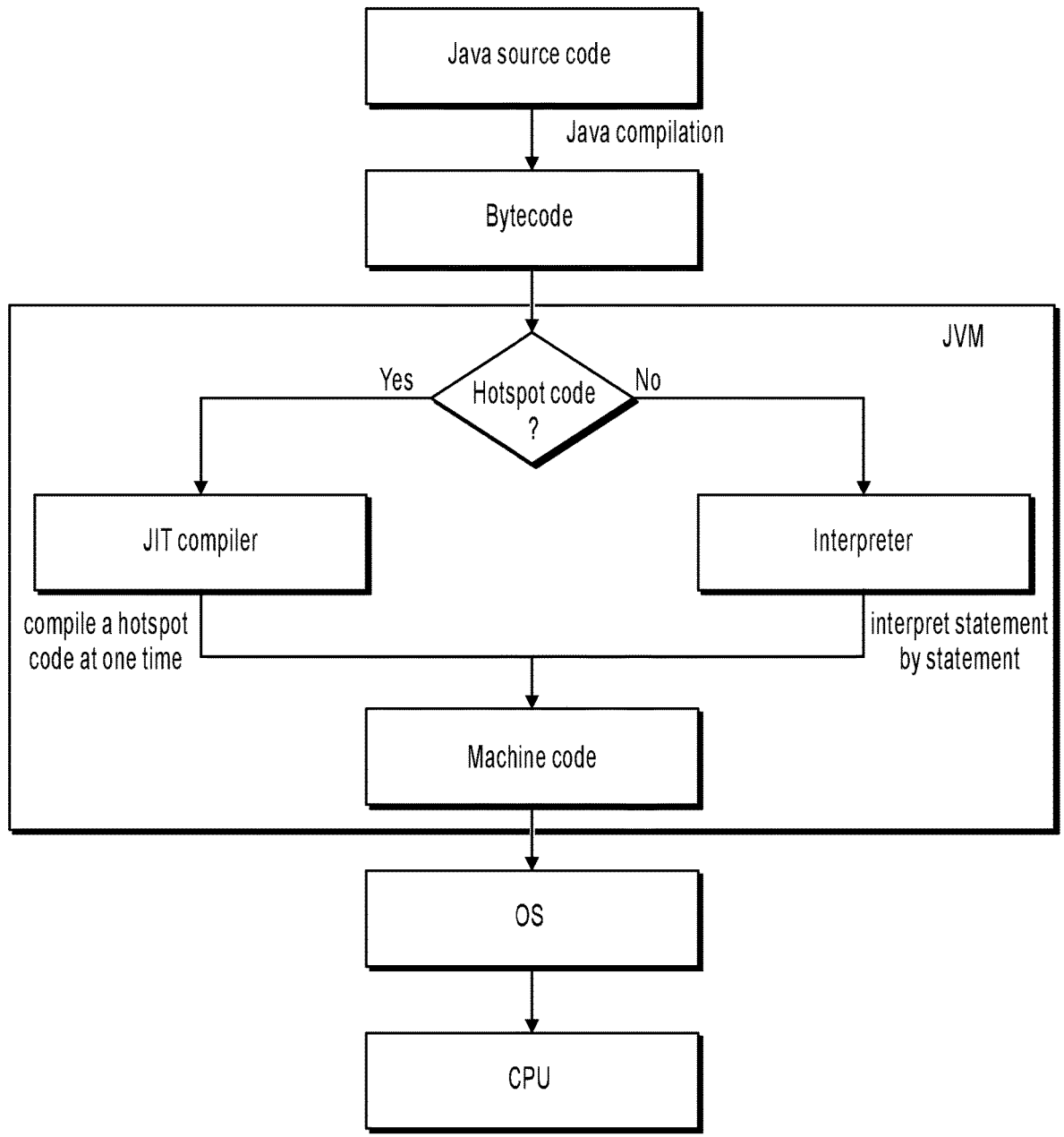
FIG. 2 is a schematic diagram of a principle of an interpretation execution and a JIT compilation according to one or more embodiments of the present disclosure.

The working principle of the JIT Compiler is, for example, shown in FIG. 2. The JAVA source code is compiled by the JAVA compiler to generate a piece of JAVA bytecode, which is distributed to two execution paths (JIT Compiler and Interpreter) after hotspot analysis. A code determined as a hotspot (high frequency execution) is compiled in the JIT Compiler to obtain a machine code, cached and executed, which is generally executed by a CPU under the control of an Operating System (OS). A code with low frequency accesses the Interpreter, where the code is translated into a machine code and then be executed by the CPU under the control of the OS.

Due to the correlation of backward and forward of the program code, there is often a large space for optimization in the compilation process. The execution efficiency of optimized machine code will be much higher than that of directly translated machine code. If better performance is to be obtained, optimization of a compiler is necessary. The compilation progress of the JIT Compiler may be time consuming. In particular, the JIT Compiler can take a long time to compile the bytecode for the first time, and is even more time-consuming than the interpretation execution. Then, for some JAVA programs, if the hotspots are not very prominent, i.e. overall execution frequencies is not very high, while the overall execution process is long, it is difficult for the JIT Compiler to take advantage of the compilation execution.

Figure 8:
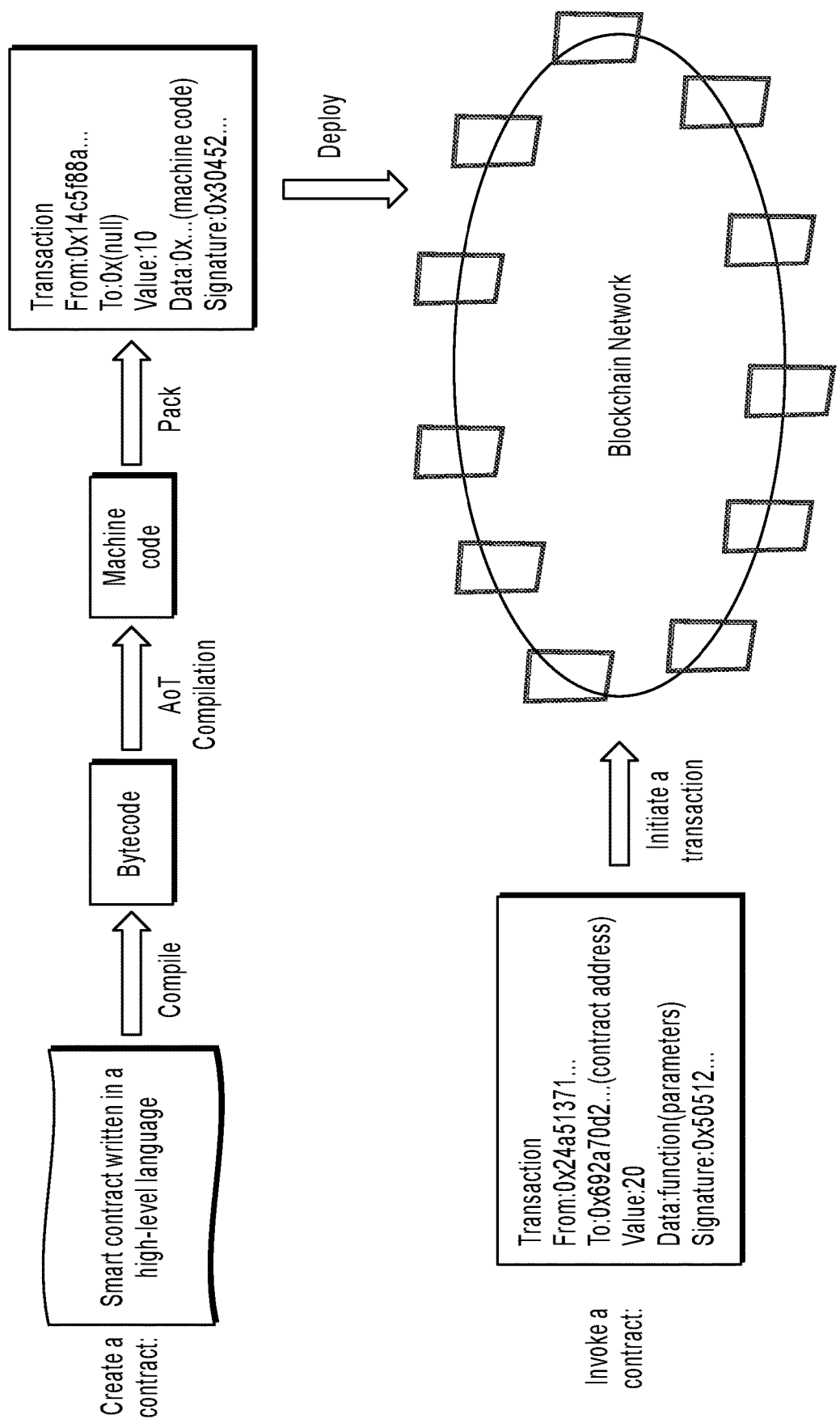
FIG. 8 is a schematic diagram of creating a smart contract and invoking a smart contract according to one or more embodiments of the present disclosure.

In addition, another idea has been put forward, that is, AoT (Ahead of Time). AoT is equivalent to a pre-compiled execution method. A bytecode is compiled once for target execution environment before a program is run to obtain a machine code, which is then deployed to a target machine for execution as shown in FIG. 8. AoT can run as efficiently as compilation execution. But during the AoT, it is necessary to clearly know the hardware, the instruction set architecture and the system, etc. of a target system to ensure that the compiled code can be run. Furthermore, generally speaking, for instructions with the same function, the amount of statements needed in a machine code is greater than in a bytecode, and much greater than in a code written in a high-level language, in this way, for a program with the same content, it is likely that a size of the machine code>a size of the bytecode>a size of the high-level language code. The bytecode can be compiled into a machine code by AoT, in a case that the hardware, the instruction set architecture and the system, etc. of the target system are clearly known. Moreover, the machine codes for different types of target systems are different, so different versions of machine codes might need to be provided in order that there can be corresponding correctly executed machine codes on the various target systems. In this way, a total size of the machine code will generally be larger than the size of the bytecode or high-level language code.

For example, Android uses the Dalvik virtual machine before version 5.0, and uses the ART virtual machine after the version 5.0. The Dalvik uses a JIT Compiler to interpret the bytecode, while ART uses an AoT mechanism. The ART manner pre-compiles a bytecode (the installation process of an Android App is actually installing the bytecode of a program) to a machine code at the time of installing an App. After removing the process of interpreting code, applications on the Android can be executed more efficiently and started faster.

As a decentralized distributed system, the blockchain needs to maintain distributed consistency. Specifically, for a set of nodes in a distributed system, each node has a built-in state machine. Each state machine needs to execute the same instructions in the same order from the same initial state, and keep each change of state the same, thus ensuring that a consistent state is eventually reached. However, it is difficult for all node devices participating in the same blockchain network to have the same hardware configuration and software environment. Therefore, in Ethereum which is the representative of Blockchain 2.0, a virtual machine similar to the JVM, the Ethereum Virtual Machine (EVM), is used in order to ensure that the process and results of executing smart contracts are the same on each node. The differences in hardware configuration and software environment of each node can be shielded with the EVM. In this way, a developer can develop a set of code for a smart contract and upload the compiled bytecode to the blockchain after the code of the smart contract is compiled locally by the developer. When each node interprets and executes the same bytecode through the same EVM in the same initial state, the node can obtain the same final result and the same intermediate result, and can shield the differences of underlying hardware and environment between different nodes. In this way, the emergence of decentralized blockchain technology has enabled the implementation of the smart contracts proposed as early as 1994, and, because the implementation of decentralization inevitably faces differences in the hardware and operating environment of different execution machines, furthermore, the smart contract is processed by interpretation execution to ensure that the same execution results can be obtained on decentralized machines with different hardware and operating environment.

The EVM is a Turing complete virtual machine, which means that various complex logic can be implemented through the EVM. This is also one of the biggest improvements of the Ethereum as a representative of the Blockchain 2.0 over the Blockchain 1.0. A smart contract that the users publish or invoke in the Ethereum can be run on the EVM. As mentioned earlier, the EVM directly runs a bytecode, and smart contracts deployed on the blockchain can be in a form of the bytecode.

Figure 3:
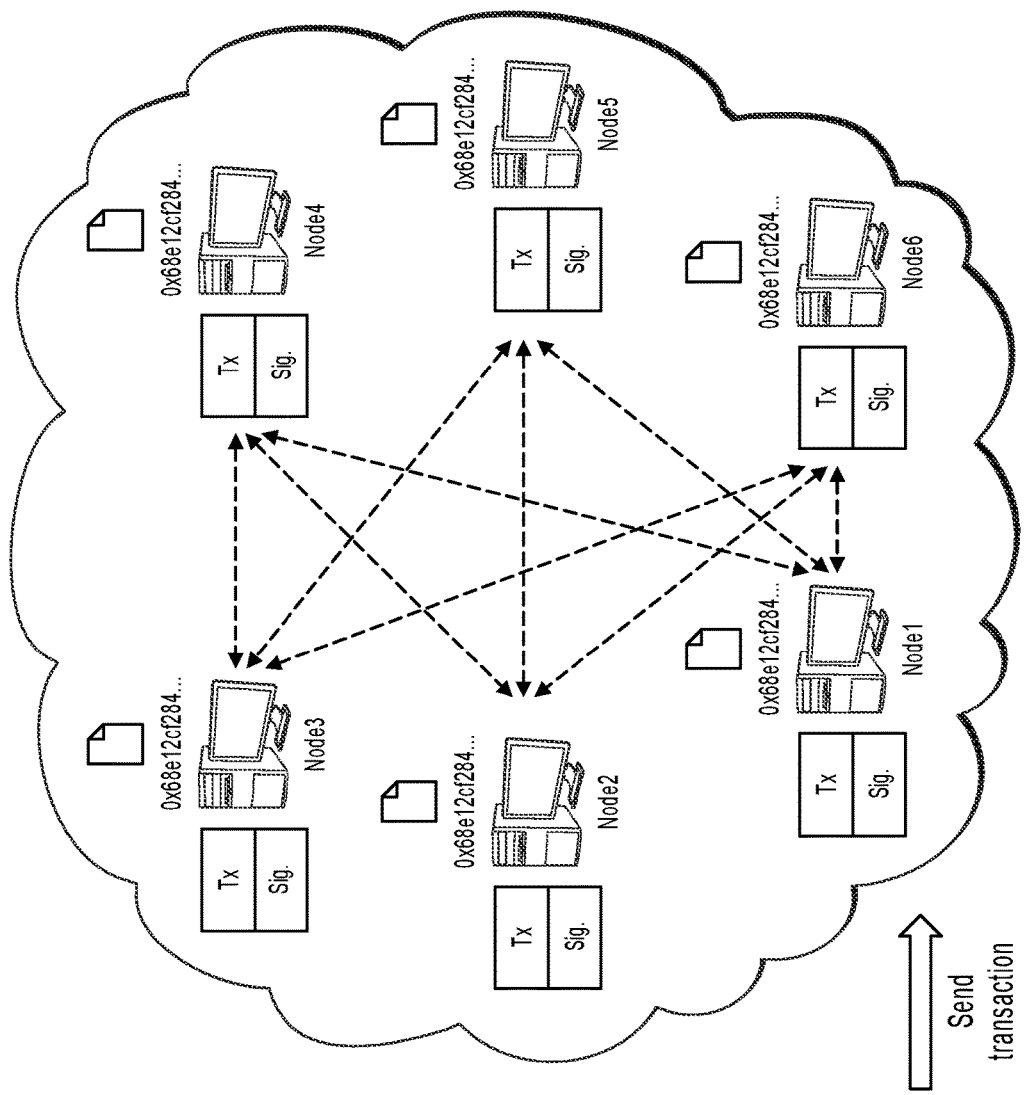
FIG. 3 is schematic diagram of a process of creating a smart contract according to one or more embodiments of the present disclosure.
Figure 3:
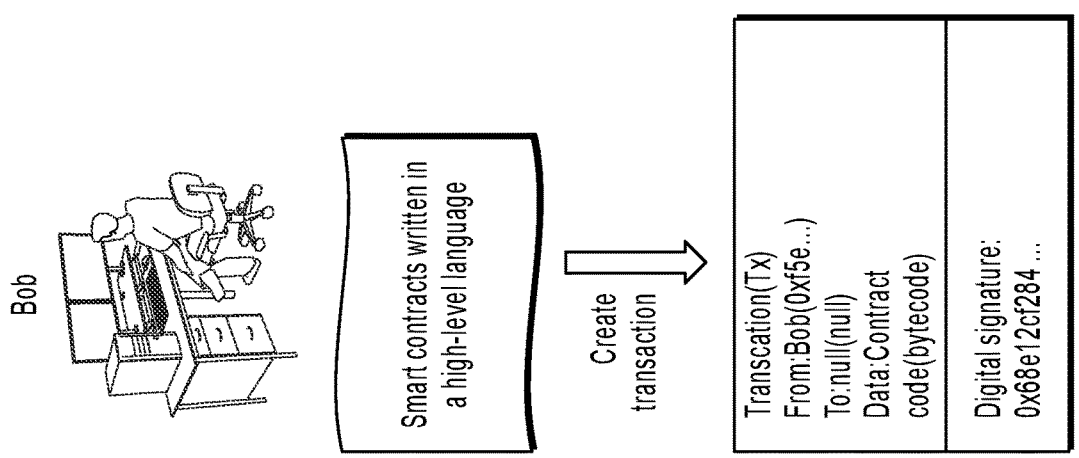

As shown in FIG. 3, after Bob sends a transaction containing information about the creation of a smart contract to the Ethereum network, the EVM of node 1 can execute the transaction and generate a corresponding contract instance. The "data" field of the transaction in FIG. 3 can store a bytecode, and the "to" field of the transaction can be a null address. Once the nodes reach an agreement through a consensus mechanism, the contract is successfully created and can be invoked by users subsequently.

When the contract is created, a contract account corresponding to the smart contract appears on the blockchain, which has a specific address, and the contract code and the account storage can be stored in the contract account. The behavior of the smart contract is controlled by the contract code, while the account storage of the smart contract stores a state of the contract. In other words, the smart contract enables the creation of a virtual account containing the contract code and account storage on the blockchain.

As mentioned above, the "data" field which includes the transaction for creating a smart contract can store a bytecode of the smart contract. The bytecode includes a series of bytes, and each byte can indicate an operation. Instead of writing a bytecode directly, developers can choose a high-level language to write smart contract code, based on various considerations such as development efficiency and readability, etc. The smart contract code written in the high-level language is compiled by a compiler to generate a bytecode, and then the bytecode can be deployed on the blockchain. There are many high-level languages supported by the Ethereum, such as Solidity, Serpent, LLL language, etc.

Taking the Solidity as an example, a contract written in the Solidity language is very similar to a class in the object-oriented programming language, and a variety of members can be declared in one contract, including state variables, functions, function modifiers, events, etc. The state variables are values permanently stored in the account storage of the smart contract and are used to save the state of the contract.

The following is Example 1 of a simple smart contract code written in the Solidity language:

```
Contract Example{
    int balance;
    function C( ){
        balance += 1;
    }
    functiongetbalance( ) returns(int){
        return balance ;
    }
}
```

Generally, when the contract is deployed in the blockchain, the state variable "balance" can be a kind of asset type newly defined in the contract. The function C( ) can define a change operation of the balance, and the function getbalance( ) returns(int) can define an operation that gets the current value of the balance and returns.

Figure 4:
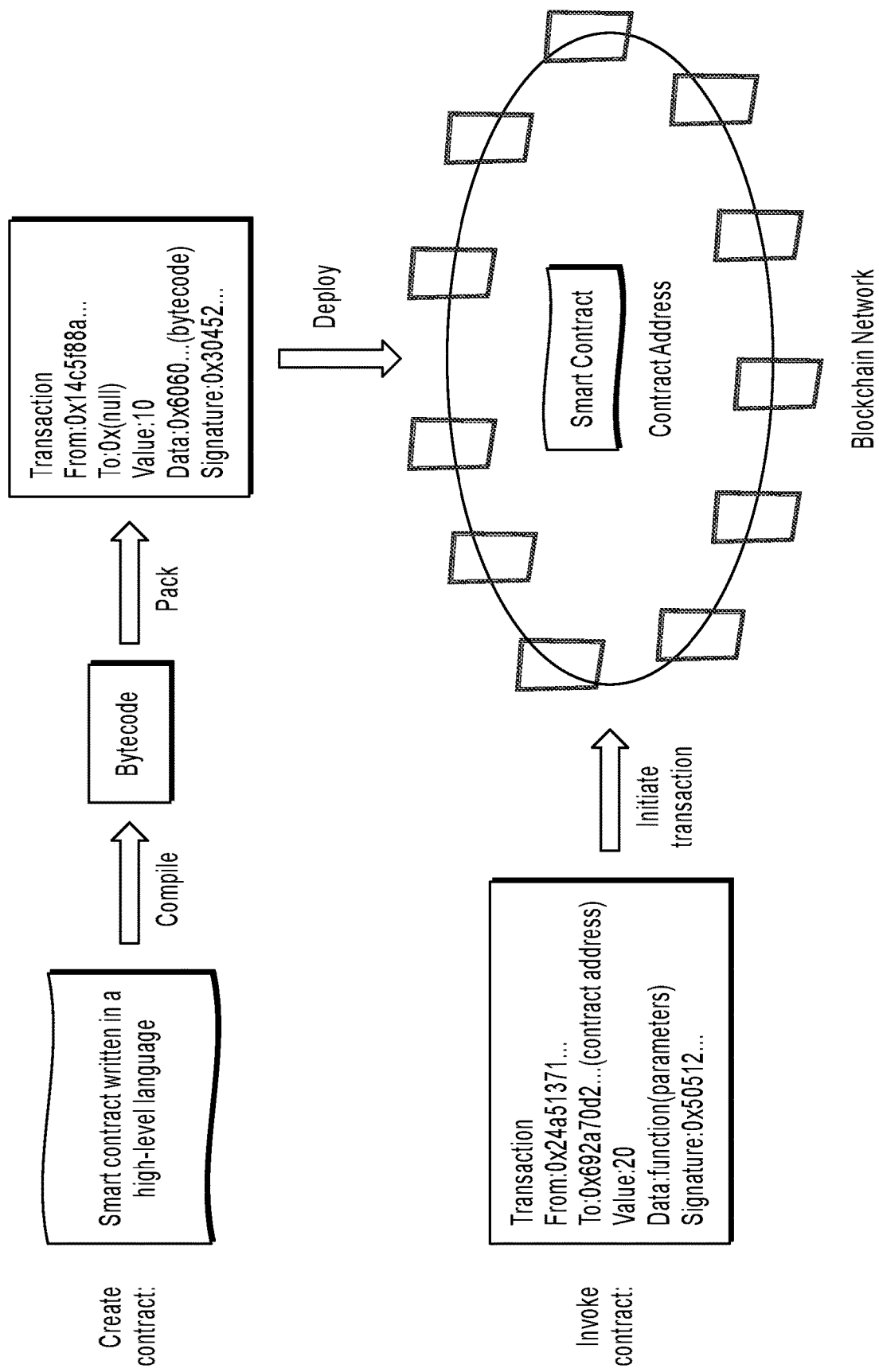
FIG. 4 is a schematic diagram of a process of invoking a smart contract according to one or more embodiments of the present disclosure.

Furthermore, as shown in FIG. 4, still using the Ethereum as an example, after Bob sends a transaction containing information about invoking a smart contract to the Ethereum network, the EVM of node 1 can execute the transaction and generate a corresponding contract instance. In FIG. 4, the "from" field of the transaction indicates the address of the account that initiated the invoke to the smart contract, the "0x692a70d2 . . . " in the "to" field represents the address of the smart contract being invoked, the value field indicates the value of Ethers in Ethereum, and the "data" field of the transaction stores methods and parameters for invoking the smart contract. The value of balance may change after the smart contract is invoked. Subsequently, a client device can view the current value of balance via a blockchain node.

Smart contracts can be executed independently at each node in the blockchain network in a prescribed manner, with all execution records and data stored in the blockchain, so that when a transaction is completed, a credential of the transaction is stored on the blockchain that cannot be tampered with and will not be lost.

Figure 5:
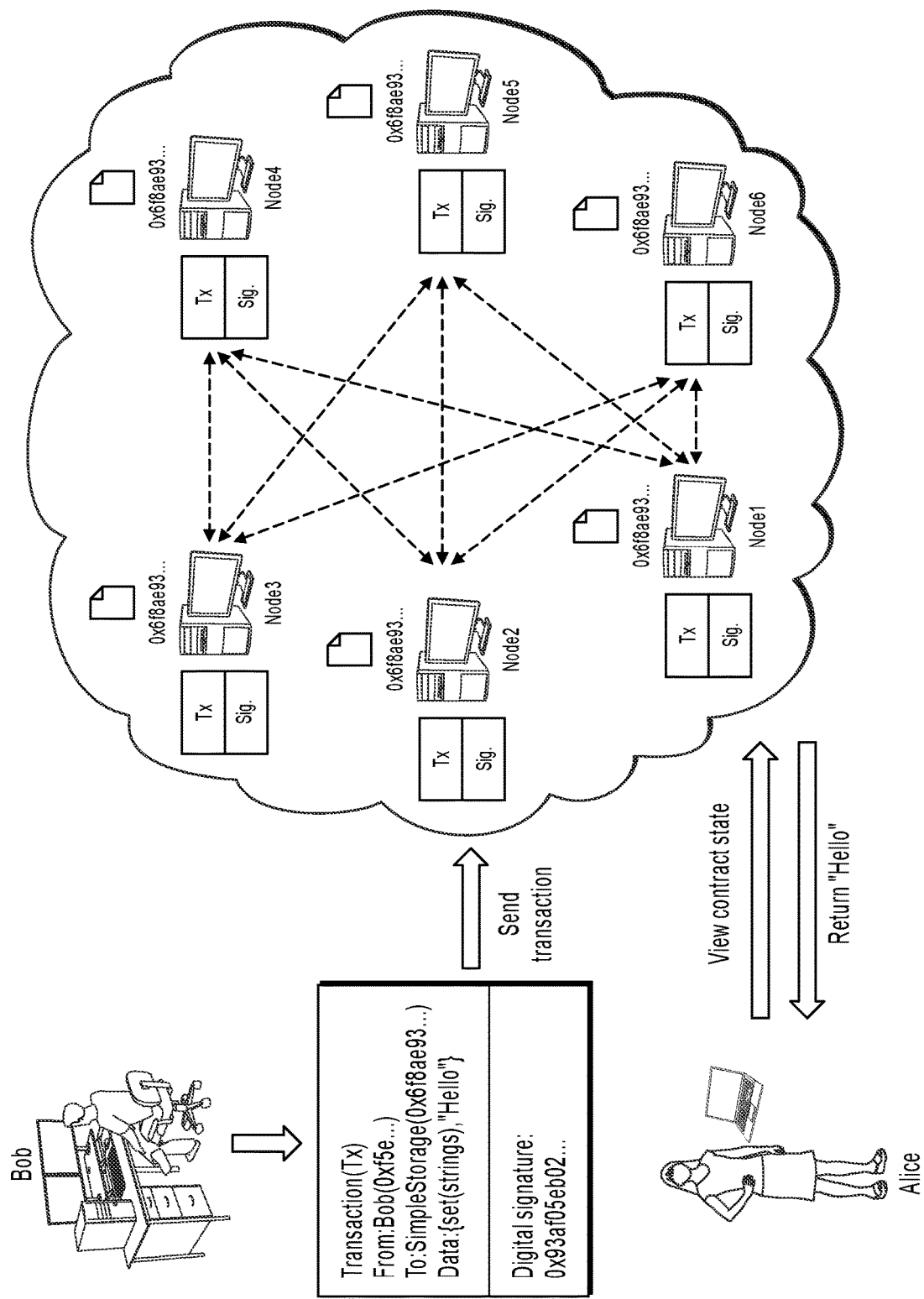
FIG. 5 is a schematic diagram of creating a smart contract and invoking a smart contract according to one or more embodiments of the present disclosure.

The diagram for creating a smart contract and invoking the smart contract is shown in FIG. 5. To create a smart contract in the Ethereum, the process of writing the smart contract, turning into bytecode (for example, compiling into bytecodes by a compilation tool such as Solc or C++), and deploying the smart contract to the blockchain, etc. needed to be completed. Invoking a smart contract in the Ethereum indicates initiating a transaction that points to the address of the smart contract (the address of the smart contract can be pointed to via the "to" field in the transaction), and a smart contract code is run distributed in a virtual machine of each node in the Ethereum network.

Figure 9:
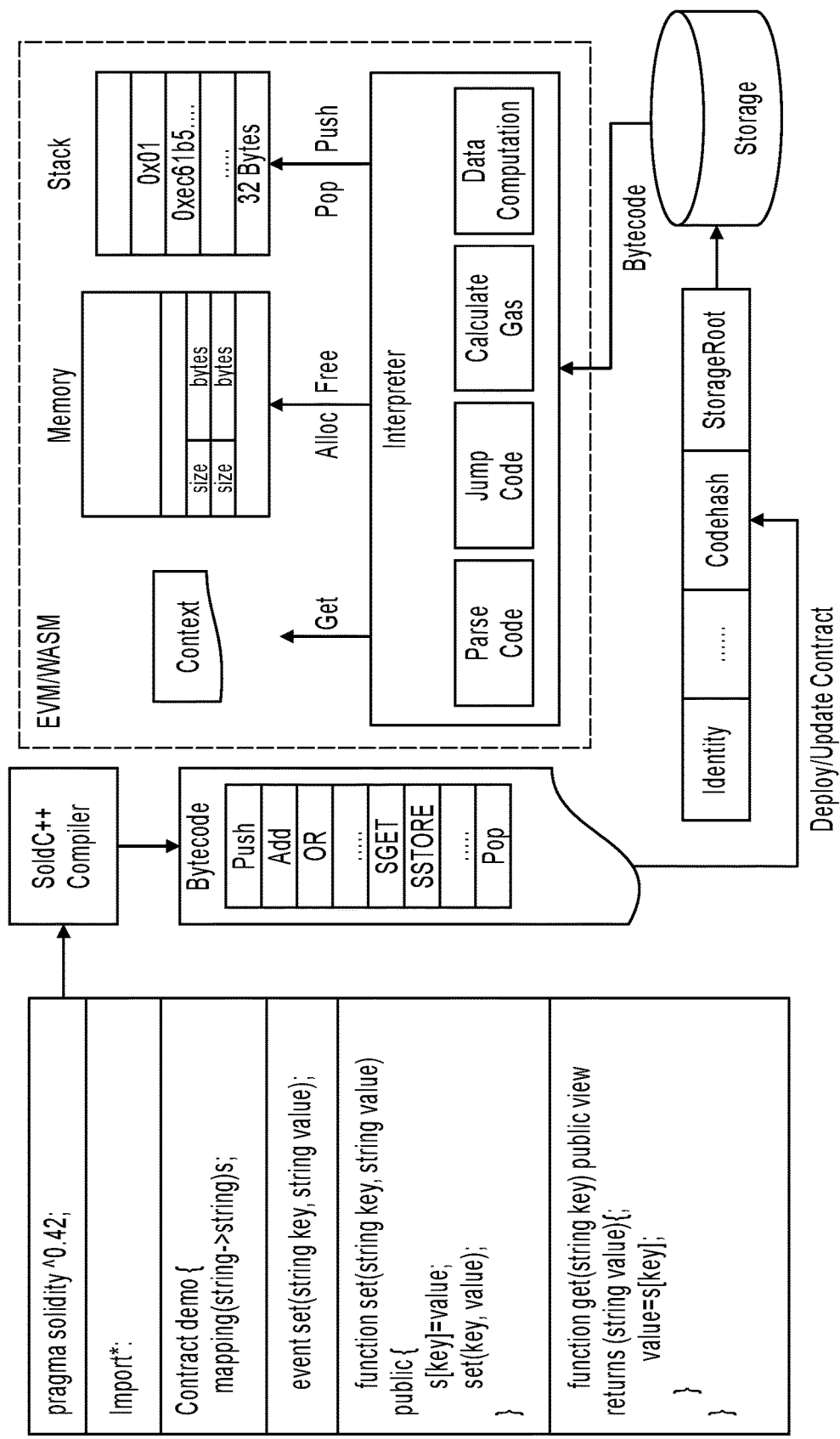
FIG. 9 is a schematic diagram illustrating an execution process of a virtual machine in a process of creating a smart contract and invoking a smart contract according to one or more embodiments of the present disclosure.

The transaction that creates the smart contract is sent to the blockchain network, and after consensus, the nodes of the blockchain node can execute the transaction. Specifically, it could be the EVM and/or WASM of the blockchain node that executes this transaction. As mentioned earlier, at this time, a contract account corresponding to the smart contract (including, for example, an identity of the account, Codehash of the contract, and StorageRoot of the contract) appears on the blockchain, the blockchain has a specific address, and the contract code and account storage can be stored in the Storage of the contract account, as shown in FIG. 9. The behavior of the smart contract is controlled by the contract code, while the account storage of the smart contract stores the state of the contract. In other words, smart contracts enable virtual accounts containing contract code and account storage to be created on the blockchain. The Codehash value can be generated or changed for contract deployment transactions or contract update transactions. Subsequently, the blockchain node can receive a transaction request for invoking the deployed smart contract, which can include the address of the invoked contract, the function in the invoked contract, and the input parameters. Generally, after consensus is performed on the transaction request, each node of the blockchain can each independently execute the smart contract specified for the invocation. Specifically, as shown in FIG. 9, the node can load a bytecode of the contract from the Storage into the virtual machine (EVM and/or WASM) based on the address of the contract; then, the bytecode is interpreted and executed by the Interpreter, which includes, for example, parsing the bytecode of the invoked contract to obtain an OPcode and storing the OPcode in the Memory of the virtual machine, at the same time the address of the invoked function can be obtained; when the amount of Gas needed to execute the contract is calculated and the Gas is enough, the corresponding address in the Memory is jumped to obtain the Opcode of the invoked function and starts to execute, and operations such as Data Computation and Push/Pop in Stack and the like are performed on the data operated by the Opcode of the invoked function, so as to complete the data computation. This process may also need some information about the Context of the contract, such as the block number, information of an initiator that invokes the contract, and the like, which can be obtained from the Context (Get operation). Finally, the generated state is stored in the Storage by invoking the Storage interface. It should be noted that the process of creating a contract may generate interpretation execution of certain functions in the contract, such as functions for initialization operations, which will also parse code, generate jump instructions, store in the Memory, and operate data in the Stack, etc. In the interpretation execution process, generally speaking, functions that are repeatedly executed are not cached, and even for functions that are executed many times, the virtual machine needs to repeat the parsing and executing process.

Figures 1, 6:
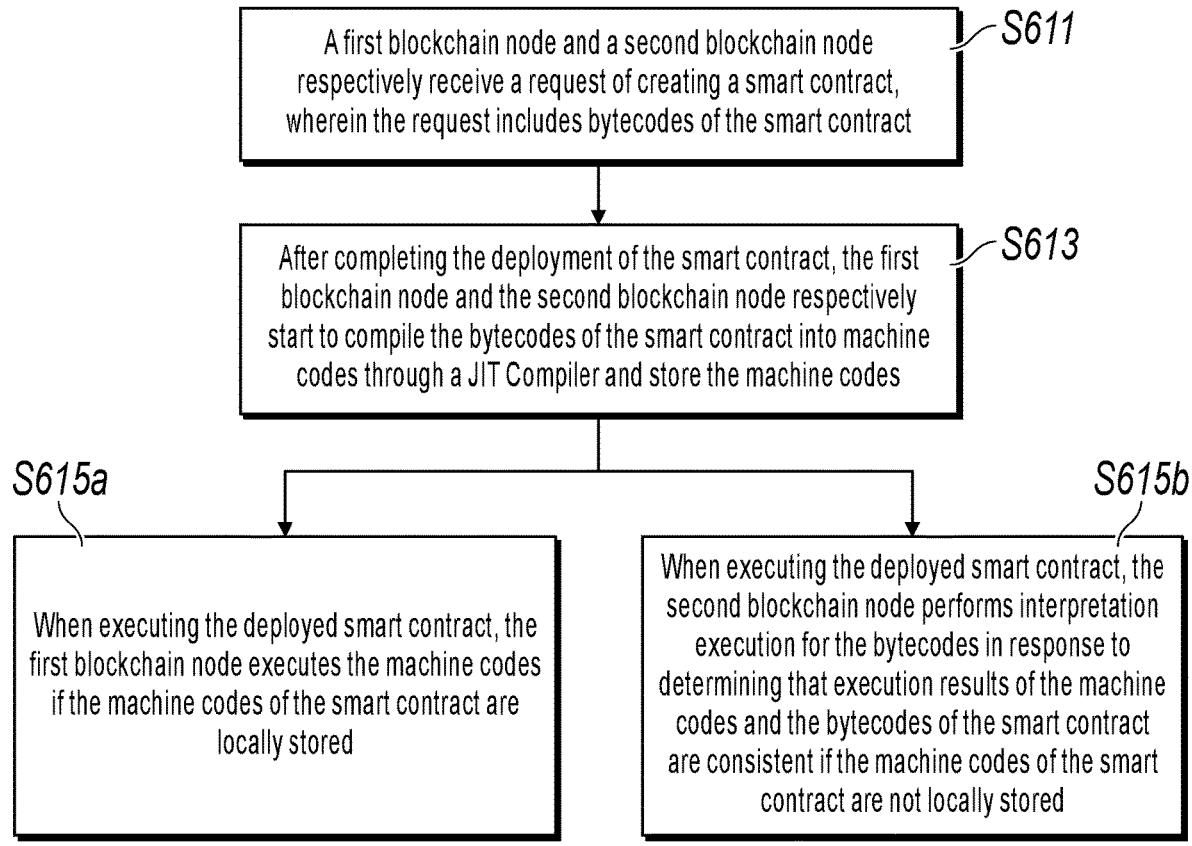
Figures 2, 6:
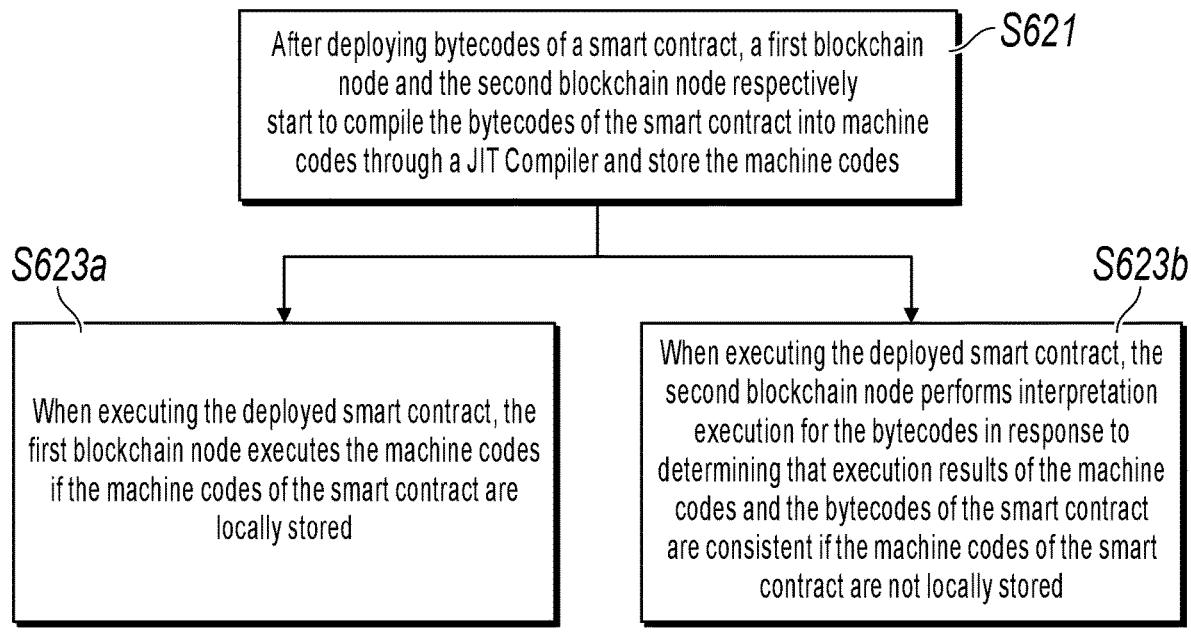

Similar to the cross-platform portability advantage and the needs of performance improvement of JVM as mentioned above, the EVM in the blockchain can also adopt technologies such as JIT Compiler and AoT to improve the execution performance of the smart contract. As shown in FIG. 6-1, the present disclosure provides a method embodiment for executing a smart contract, steps of which are detailed below.

At step S611, a first blockchain node and a second blockchain node respectively receive a request of creating the smart contract, wherein the request includes bytecodes of the smart contract.

A user can write the smart contract using a high-level language locally. The written smart contract can be compiled by a compiler into bytecodes. Further, the compiled bytecodes of the smart contract can be packaged into a transaction by a client device and sent to a blockchain network. The format of the transaction can be, for example, as shown in FIGS. 3-5, where the bytecodes of the smart contract to be created can be stored in the data field of the transaction.

The user can also directly write the smart contract using the high-level language on any blockchain node in the blockchain network. The blockchain node can also compile, by a compiler, the smart contract written using the high-level language to generate bytecodes.

The first blockchain node and the second blockchain node refer to general blockchain nodes in the blockchain network rather than a particular blockchain node or some blockchain nodes. The first blockchain node refers to a blockchain node which already obtains machine codes by compilation when executing a deployed smart contract, and the second blockchain node refers to a blockchain node which has not obtained machine codes by compilation when executing a deployed smart contract. Actually, the first blockchain node and the second blockchain node are functionally the same except that the codes to be executed can be machine codes or bytecodes due to different compilation speeds for a smart contract. Therefore, in the subsequent descriptions, the term "blockchain node" can be used in a unified way in a case of no execution of machine codes or bytecodes involved and thus the first blockchain node and the second blockchain node are not distinguished.

At step S613, after completing the deployment of the smart contract, the first blockchain node and the second blockchain node respectively start to compile the bytecodes of the smart contract into machine codes through JIT Compiler and store the machine codes.

In an Ethereum, and a system of a public blockchain, a consortium blockchain or a private blockchain with similar principle, the blockchain node can initiate consensus for one batch of transactions. The batch of transactions can include the transaction of creating a smart contract. Generally, after consensus, each consensus node stores bytecodes of the smart contract to be created locally. Each consensus node can execute the transaction of creating a smart contract locally, create a corresponding contract account, and create one address for the smart contract account based on the same rule, where the addresses that various consensus nodes create for the same contract are the same. In this way, deployment of the contract is completed.

After completing the creation of the smart contract, that is, after deploying the smart contract, the blockchain node can start to compile the bytecodes of the smart contract into machine codes through JIT Compiler and store the machine codes. After completing the creation of the smart contract, the blockchain node can immediately start to perform JIT compilation for the bytecodes of the smart contract because a service request for invoking the deployed smart contract can be initiated shortly after the deployment of the smart contract. In addition, JIT Compiler needs to consume more system resources and time. Therefore, when system resources are distributed for performing JIT compilation in a case of heavy service load of the blockchain node, service processing will be affected. As a result, the blockchain node can also perform JIT compilation for the bytecodes of the smart contract in a relatively idle time period, thereby reducing or avoiding the influence on the service processing. Furthermore, after the blockchain node completes creation of the smart contract, the blockchain node can also perform JIT compilation for the bytecodes of the smart contract in response to receiving a transaction request for invoking the deployed smart contract.

When each node in the blockchain performs JIT compilation for the bytecodes of the same smart contract locally, each node only needs to adjust its own processor architecture, and operation environment and the like without compiling machine codes of multiple versions. In this way, the size of the machine codes stored on the node device can be greatly reduced, thereby lowering the storage overhead.

Preferably, the storage is caching. By caching to a memory, faster subsequent response can be made. Specifically, the memory can be one cache region in a virtual machine. Of course, in many cases, the response speed can be increased to some extent even in case of caching to a magnetic disk.

The EVM in the blockchain adopts JIT Compiler technology to improve the execution performance of the smart contract which will be detailed below.

Firstly, hotspot codes are identified in a process of interpreting and/or executing the bytecodes of the smart contract, for example, the number of executions is calculated using a code counter of a JIT Compiler engine to analyze which bytecodes are executed several times, thus caching the interpreted machine codes. Caching is not necessary for those operations executed a smaller number of times. In this way, an optimal balance of the execution efficiency and the memory overhead can be reached. By identifying hotspot codes and caching, except for the first interpretation, the cached machine codes can be directly used subsequently in a process of executing the bytecodes several times, thereby eliminating the process of re-interpretation of the bytecodes and reducing the time. The granularity of identifying the execution number can be a function level or a code block level. Generally, a code block can be a part of a function or can be comprised of several functions.

Secondly, further optimization can be performed in the JIT compilation. In combination with correlation of backward and forward of program codes, compilation is performed and the machine codes after optimizing compilation are cached for use in subsequent invocation. The execution efficiency of the machine codes after compilation optimization will generally be higher than that of the machine codes obtained by direct interpretation. On one hand, the JIT Compiler engine can carry the hardware and environment information of the blockchain node performing compilation, so that the machine codes obtained by compilation have hardware+environment optimization, specifically including optimization in a process of generating machine codes, including optimization of instruction level, and distribution and optimization of register and the like. On the other hand, the JIT Compiler engine can analyze the context information, for example, branch jump statements executed in the current function, to identify which statement has the highest jump possibility, and then adjust the statement having the highest jump possibility to be foremost, thereby firstly hitting the branch statement with a higher probability during execution. In the optimization process of the compiler, dead code elimination can be performed by performing data flow analysis and/or live variable analysis, for example, those non-reaching branches are eliminated. Further, optimization can be performed for loop statement and replacement is performed for common word expression and the like.

At step S615a, when executing the deployed smart contract, the first blockchain node executes the machine codes if the machine codes of the smart contract are locally stored.

At step S615b, when executing the deployed smart contract, the second blockchain node performs interpretation execution for the bytecodes in response to determining that execution results of the machine codes and the bytecodes of the smart contract are consistent if the machine codes of the smart contract are not locally stored.

After the smart contract is deployed, an invocation to the smart contract can be provided. In this case, a client device (possibly different from the client device initiating a transaction for creating a contract at step S611) can initiate an invocation to the contract. For example, the client device initiates a transaction, where the to field is an address of the deployed smart contract, and the data field can include method and input parameters for invoking the contract. In this way, the invocation to the deployed smart contract can be realized. Generally, after one batch of transactions including the transaction for invoking a contract that passed consensus, various consensus nodes can execute the transactions respectively.

When executing the deployed smart contract, each blockchain node in the blockchain network can first view whether the machine codes of the invoked contract exist locally. If the machine codes exist, it indicates that JIT compilation has been performed for the bytecodes of the smart contract locally, and otherwise, JIT compilation has not been performed for the bytecodes of the smart contract locally or the compilation has not been completed. Since different blockchain nodes can differ in processing performance or other factors can exist, different blockchain nodes can have different JIT compilation progresses for the bytecodes of the invoked contract, for example, the first blockchain node has already generated the machine codes of the smart contract by compilation, and the second blockchain node has not performed JIT compilation for the bytecodes of the smart contract or the compilation has not been completed.

The first blockchain node can wait for the second blockchain node to perform JIT compilation. In response to determining that the second blockchain node has already generated the machine codes by compilation, the first blockchain node and the second blockchain node can execute local machine codes respectively. However, the waiting process will cause the first blockchain node to respond in delay, thus slowing down the transaction execution speed; and the second blockchain node also cannot respond quickly. Further, the first blockchain node cannot execute the machine codes preemptively, and otherwise, if the second blockchain node unsuccessfully performs compilation or suffers another anomaly, inconsistency of state data will occur between the first blockchain node and the second blockchain node.

To satisfy the needs of timely response and quick feedback, the first blockchain node does not need to wait for the second blockchain node to perform JIT compilation, but the first blockchain node and the second blockchain node respectively execute the contract codes of different forms.

Due to completion of the compilation, the first blockchain node can execute the compiled machine codes, avoiding delay caused by waiting for the compilation process of the second blockchain node. Specifically, the first blockchain node can directly execute the machine codes corresponding to the invoked function/code block in the smart contract and input the input parameters indicated by the data field. In a case that the machine codes of the smart contract are stored, because the machine codes can be directly executed by a CPU (under the control of OS), the first blockchain node can execute the smart contract at a significantly-increased speed. Further, caching the machine codes of the smart contract into a memory can further increase the execution speed of the smart contract. Of course, the execution speed can be increased to some extent even in case of caching to a magnetic disk. The first blockchain node executes the machine codes, which specifically includes: executing the stored machine codes corresponding to the invoked function and/or code block in the smart contract.

Without waiting for the completion of JIT compilation, the second blockchain node can perform interpretation execution for the bytecodes of the deployed smart contract in response to determining that execution results of the machine codes and the bytecodes of the smart contract are consistent. The consistency of the execution results of the machine codes and the bytecodes can include one or more of the following dimensions: consistency of returned contract execution results, consistency of formed contract storages, and consistency of consumed blockchain assets and the like. To ensure consistency of the execution results of the machine codes and the bytecodes, test can be performed in advance for the machine codes and the bytecodes of the smart contract in at least one verification scenario respectively. If the test results are consistent, it indicates that the execution results of the machine codes and the bytecodes are consistent and otherwise the execution results are inconsistent. Further, formal verification can be performed for the machine codes and the bytecodes. If the verification results are consistent, it indicates that the execution results of the machine codes and the bytecodes are consistent, and otherwise, the execution results are inconsistent. Above several verification manners can be used at the same time. In this case, when the verification results obtained in all verification manners are consistent, it is determined that the execution results of the machine codes and the bytecodes are consistent.

In order to respond to a service request in time, that is, quickly respond to a service request initiated for invoking the deployed smart contract, the second blockchain node can further query current JIT compilation for the bytecodes of the smart contract in case of no local machine codes, specifically including the following two cases:

In the first case, when the second blockchain node executes the deployed smart contract, if the machine codes of the smart contract are not locally stored, the second blockchain node can further query the current JIT compilation for the bytecodes of the smart contract, and if the JIT compilation is in progress, can perform interpretation execution for the bytecodes of the smart contract in response to determining that the execution results of the machine codes and the bytecodes of the smart contract are consistent.

If the machine codes of the smart contract are not locally stored, the second blockchain node can further query the current JIT compilation for the bytecodes of the smart contract, and the query result can be that JIT compilation is in progress. For some service requests for invoking the smart contract, the priority is to obtain quick response, which is also the reason that various blockchain systems manage to increase transactions per second (TPS). When the invoked smart contract is under JIT compilation, in order to make quick response, the second blockchain node cannot wait for the completion of the JIT compilation but perform interpretation execution for the bytecodes of the smart contract.

In the second case, when the second blockchain node executes the deployed smart contract, if the machine codes of the smart contract are not locally stored, the second blockchain node can further query the current JIT compilation for the bytecodes of the smart contract, and if the JIT compilation is not started, can start the JIT compilation and perform interpretation execution for the bytecodes of the smart contract.

Similar to the first case, when JIT compilation has not been started for the invoked smart contract, in order to make quick response, the second blockchain node can perform interpretation execution for the bytecodes of the smart contract. Further, in a case that JIT compilation has not been started, the second blockchain node can start JIT compilation.

Performing, by the second blockchain node, interpretation execution for the bytecodes of the smart contract can be that statement-by-statement interpretation can be performed for the bytecodes of the smart contract by using EVM so as to perform piece-by-piece execution for the interpreted machine codes. The virtual machine herein can also be Web Assembly (WASM) virtual machine or JAVASCRIPT Virtual Machine (JSVM) or the like in addition to the EVM. Descriptions herein are made with EVM as an example.

Similar to the first blockchain node, the second blockchain node performs storage operation for the compiled machine codes after completing JIT compilation for the smart contract. In this case, when the deployed smart contract is executed next time, because the machine codes of the invoked smart contract obtained by performing JIT compilation are locally stored, which means the JIT compilation has already been completed for the bytecodes of the smart contract locally, the same blockchain node changes from the second blockchain node to the first blockchain node. Furthermore, the blockchain node can directly execute the machine codes corresponding to the invoked function and obtained by JIT compilation in the smart contract and input the input parameters indicated by the data field.

It should be noted that the first blockchain node in step S611 can be different from the first blockchain nodes in steps S613 and S615a; Similarly, the second blockchain node in step S611 can be different from the second blockchain nodes in steps S613 and S615b. This is because a node for receiving a transaction, a node for initiating a consensus and a node for executing the transaction can be different nodes or can be the same nodes in a blockchain serving as a distributed system.

Another method embodiment for executing a smart contract in the present disclosure will be described below in combination with FIG. 6-2. The method includes the following steps.

At step S621, after deploying bytecodes of the smart contract, a first blockchain node and a second blockchain node start to compile the bytecodes of the smart contract into machine codes through JIT Compiler respectively and store the machine codes.

After deploying bytecodes of the smart contract, respectively starting, by the first blockchain node and the second blockchain node, to compile the bytecodes of the smart contract into the machine codes through JIT Compiler specifically includes:

after completing creation of the smart contract, immediately starting, by the first blockchain node and the second blockchain node, to perform JIT compilation for the bytecodes of the smart contract respectively; or, after completing creation of the smart contract, performing, by the first blockchain node and the second blockchain node, JIT compilation for the bytecodes of the smart contract respectively in a relatively idle time period; or, after receiving a transaction request for invoking the created smart contract, performing, by the first blockchain node and the second blockchain node, JIT compilation for the bytecodes of the smart contract respectively.

Compiling the bytecodes of the smart contract into the machine codes through JIT Compiler and storing the machine codes include:

performing compilation and storage by identifying hotspot bytecodes in a process of interpreting and/or executing the bytecodes of the smart contract; and/or, performing optimizing compilation and storage in a process of interpreting and/or executing the bytecodes of the smart contract.

A granularity of identifying the hotspot bytecodes includes a function level or a code block level.

At step S623a, when executing the deployed smart contract, the first blockchain node executes the machine codes if the machine codes of the smart contract are locally stored.

Executing the machine codes by the first blockchain node can include executing the stored machine codes corresponding to the invoked function and/or code block in the smart contract.

The specific manner of storage can be caching. By caching to a memory, faster subsequent response can be made. Of course, in many cases, the response speed can be increased to some extent even in case of caching to a magnetic disk.

At step S623b, when executing the deployed smart contract, the second blockchain node performs interpretation execution for the bytecodes in response to determining that execution results of the machine codes and the bytecodes of the smart contract are consistent if the machine codes of the smart contract are not locally stored.

Performing, by the second blockchain node, interpretation execution for the bytecodes of the smart contract can include:

performing, by the second blockchain node, interpretation execution for the bytecodes corresponding to an invoked function in the smart contract.

When executing the deployed smart contract, performing, by the second blockchain node, interpretation execution for the bytecodes of the smart contract in response to determining that execution results of the machine codes and the bytecodes of the smart contract are consistent if the machine codes of the smart contract are not locally stored can specifically include:

when the second blockchain node executes the deployed smart contract, if the machine codes of the smart contract are not locally stored, further querying, by the second blockchain node, current JIT compilation for the bytecodes of the smart contract, and if the JIT compilation is in progress, performing interpretation execution for the bytecodes of the smart contract in response to determining that the execution results of the machine codes and the bytecodes of the smart contract are consistent; or, when the second blockchain node executes the deployed smart contract, if the machine codes of the smart contract are not locally stored, further querying, by the second blockchain node, current JIT compilation for the bytecodes of the smart contract, and if the JIT compilation is not started, starting the JIT compilation and performing interpretation execution for the bytecodes of the smart contract in response to determining that the execution results of the machine codes and the bytecodes of the smart contract are consistent.

The consistency of the execution results of the machine codes and the bytecodes includes at least one of: consistency of returned contract execution results, consistency of formed contract storages, or consistency of consumed blockchain assets.

Verifying whether the execution results of the machine codes and the bytecodes are consistent includes:

comparing test results of the machine codes and the bytecodes in at least one verification scenario, wherein consistency of the test results indicates that the execution results of the machine codes and the bytecodes are consistent; and/or, performing formal verification for the machine codes and the bytecodes, wherein consistency of the verification results indicates that the execution results of the machine codes and the bytecodes are consistent.

Figure 7:
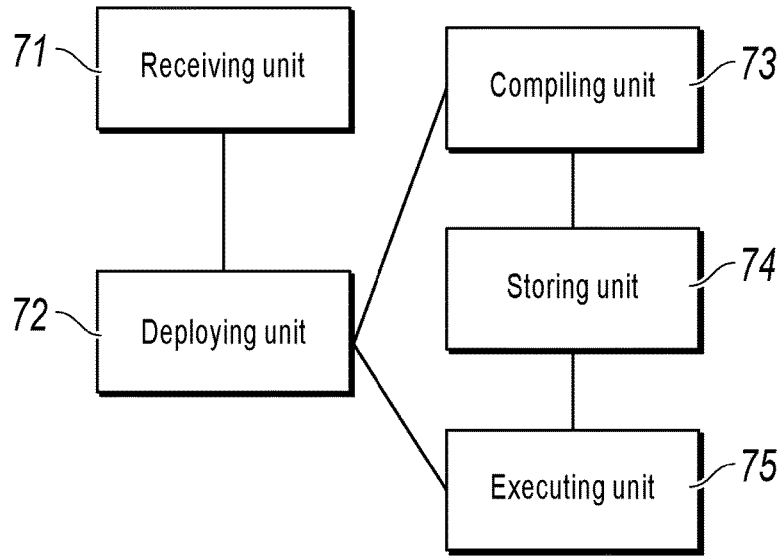
FIG. 7 is a diagram of a modular structure of a blockchain node according to one or more embodiments of the present disclosure.

A blockchain node embodiment for executing a smart contract in the present disclosure will be described below. As shown in FIG. 7, the blockchain node includes the following units:

a receiving unit 71, configured to receive a request for creating a smart contract where the request includes bytecodes of the smart contract;

a deploying unit 72, configured to deploy the smart contract according to the request for creating a smart contract;

a compiling unit 73, configured to start to compile the bytecodes of the smart contract into machine codes through Just-In-Time (JIT) Compiler after the deploying unit 72 completes deployment;

a storing unit 74, configured to store the machine codes compiled by the compiling unit 73; and an executing unit 75, configured to execute the machine codes in response to receiving an invocation to the deployed smart contract if the storing unit 74 stores the machine codes of the smart contract, and perform interpretation execution for the bytecodes of the smart contract in response to determining that execution results of the machine codes and the bytecodes of the smart contract are consistent if the storing unit 74 does not store the machine codes of the smart contract.

After the deploying unit 72 completes deployment of the smart contract, the compiling unit 73 starts to compile the bytecodes of the smart contract into the machine codes through JIT Compiler, including:

after the deploying unit 72 completes deployment of the smart contract, immediately starting, by compiling unit 73, to perform JIT compilation for the bytecodes of the smart contract; or, after the deploying unit 72 completes deployment of the smart contract, performing, by compiling unit 73, JIT compilation for the bytecodes of the smart contract in a relatively idle time period; or, after the executing unit 75 receives a transaction request for invoking the created smart contract, performing, by the compiling unit 73, JIT compilation for the bytecodes of the smart contract.

The storing unit 74 can be a memory or magnetic disk storage.

Executing the machine codes by the executing unit 75 includes: executing, by the executing unit 75, the stored machine codes corresponding to an invoked function and/or code block in the smart contract.

Performing, by the executing unit 75, interpretation execution for the bytecodes of the smart contract includes:

performing, by the executing unit 75, interpretation execution for the bytecodes corresponding to the invoked function in the smart contract.

When executing the deployed smart contract, performing, by the executing unit 75, interpretation execution for the bytecodes of the smart contract if the storing unit 74 does not store the machine codes of the smart contract includes:

when the executing unit 75 executes the deployed smart contract, if the storing unit 74 does not store the machine codes of the smart contract, further querying, by the executing unit 75, current JIT compilation for the bytecodes of the smart contract, and if the JIT compilation is in progress, performing interpretation execution for the bytecodes of the smart contract; or, when the executing unit 75 executes the deployed smart contract, if the storing unit 74 does not store the machine codes of the smart contract, further querying, by the executing unit 75, current JIT compilation for the bytecodes of the smart contract, and if the JIT compilation is not started, starting the JIT compilation and performing interpretation execution for the bytecodes of the smart contract.

Determining, by the executing unit 75, the consistency of the execution results of the machine codes and the bytecodes includes at least one of: consistency of returned contract execution results, consistency of formed contract storages, or consistency of consumed blockchain assets.

Verifying whether the execution results of the machine codes and the bytecodes are consistent includes:

comparing test results of the machine codes and the bytecodes in at least one verification scenario, where consistency of the test results indicates that the execution results of the machine codes and the bytecodes are consistent; and/or, performing formal verification for the machine codes and the bytecodes, where consistency of the verification results indicates that the execution results of the machine codes and the bytecodes are consistent.

In addition, the blockchain node for executing the smart contract can also execute the method in the steps from S621 to S625b.

The present disclosure further provides a blockchain node embodiment, including:

a processor, a memory storing programs thereon, where the programs are executed by the processor to execute a smart contract according to the above-described method.

The present disclosure further provides a storage media embodiment for storing programs, where the programs are executed to execute the method as described above.

The present disclosure further provides a blockchain system embodiment, including a first blockchain node and a second blockchain node.

The first blockchain node includes:

a first receiving unit, configured to receive a request for creating a smart contract, where the request includes bytecodes of the smart contract;

a first deploying unit, configured to deploy the smart contract according to the request for creating a smart contract received by the first receiving unit;

a first compiling unit, configured to start compile the bytecodes of the smart contract into machine codes through JIT Compiler after the first deploying unit completes deployment;

a first storing unit, configured to store the machine codes compiled by the first compiling unit;

a first executing unit, configured to execute the machine codes in response to receiving an invocation to the deployed smart contract if the storing unit stores the machine codes of the smart contract.

The second blockchain node includes:

a second receiving unit, configured to receive a request for creating a smart contract, where the request includes bytecodes of the smart contract;

a second deploying unit, configured to deploy the smart contract according to the request for creating a smart contract received by the second receiving unit;

a second compiling unit, configured to start to compile the bytecodes of the smart contract into machine codes through JIT Compiler after the second deploying unit completes deployment;

a second storing unit, configured to store the machine codes compiled by the second compiling unit;

a second executing unit, configured to, when receiving an invocation to the deployed smart contract, perform interpretation execution for the bytecodes of the smart contract in response to determining that the execution results of the machine codes and the bytecodes of the smart contract are consistent if the second storing unit does not store the machine codes of the smart contract.

After the first deploying unit or the second deploying unit completes deployment of the smart contract, the first compiling unit or the second compiling unit starts to compile the bytecodes of the smart contract into the machine codes through JIT Compiler, including:

after the first deploying unit or the second deploying unit completes creation of the smart contract, immediately starting, by the first compiling unit or the second compiling unit, to perform JIT compilation for the bytecodes of the smart contract; or, after the first deploying unit or the second deploying unit completes creation of the smart contract, performing, by the first compiling unit or the second compiling unit, JIT compilation for the bytecodes of the smart contract in a relatively idle time period; or, after the first executing unit or the second executing unit receives a transaction request for invoking the created smart contract, performing, by the first compiling unit or the second compiling unit, JIT compilation for the bytecodes of the smart contract.

The first storing unit and/or the second storing unit can be a memory or magnetic disk storage.

Executing the machine codes by the first executing unit includes: executing, by the first executing unit, the stored machine codes corresponding to an invoked function and/or code block in the smart contract.

Performing, by the second executing unit, interpretation execution for the bytecodes of the smart contract includes:

performing, by the second executing unit, interpretation execution for the bytecodes corresponding to the invoked function in the smart contract.

When the second executing unit executes the deployed smart contract, if the second storing unit does not store the machine codes of the smart contract, the second executing unit performs interpretation execution for the bytecodes of the smart contract in response to determining that the execution results of the machine codes and the bytecodes of the smart contract are consistent, including:

when the second executing unit executes the deployed smart contract, if the second storing unit does not store the machine codes of the smart contract, further querying, by the second executing unit, current JIT compilation for the bytecodes of the smart contract, and if the JIT compilation is in progress, performing interpretation execution for the bytecodes of the smart contract; or, when the second executing unit executes the deployed smart contract, if the second storing unit does not store the machine codes of the smart contract, further querying, by the second executing unit, current JIT compilation for the bytecodes of the smart contract, and if the JIT compilation is not started, starting JIT compilation and performing interpretation execution for the bytecodes of the smart contract.

Determining, by the second executing unit, the consistency of the execution results of the machine codes and the bytecodes includes at least one of: consistency of returned contract execution results, consistency of formed contract storages, or consistency of consumed blockchain assets.

Verifying whether the execution results of the machine codes and the bytecodes are consistent includes:

comparing test results of the machine codes and the bytecodes in at least one verification scenario, wherein consistency of the test results indicates that the execution results of the machine codes and the bytecodes are consistent; and/or, performing formal verification for the machine codes and the bytecodes, wherein consistency of the verification results indicates that the execution results of the machine codes and the bytecodes are consistent.

Furthermore, the blockchain node for executing the smart contract can also execute the method in the steps from S621 to S623.

The present disclosure further provides a storage media embodiment for storing programs, where the programs are executed to execute the method as described above.

The system, device, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

In a typical configuration, a computing device includes one or more processors (CPU), one or more input/output interfaces, one or more network interfaces, and one or more memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage media include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, a quantum memory, graphene-based storage media or another magnetic storage device, or any other non-transmission medium. The computer storage media can be used to store information accessible by a computing device. As described in the present specification, the computer readable medium does not include computer-readable transitory media such as a modulated data signal and a carrier.

It is worthwhile to further note that the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. An element described by "includes a . . . " further includes, without more constraints, another the same or identical element in the process, method, product, or device that includes the said element.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily require a particular order or a sequential order as shown to achieve the desired results. In some embodiments, multitasking and parallel processing are also possible or may be advantageous.

The terms used in one or more embodiments of the present specification are for the purpose of describing particular embodiments only and are not intended to limit one or more embodiments of the present specification. The singular forms of "a", "said" and "the" used in one or more embodiments of the present specification and the appended claims are also intended to include the plural forms, unless other meanings are clearly indicated by the context. It should also be understood that the term "and/or" used herein refers to and includes any or all possible combinations of one or more associated listed items.

It shall be understood that although the terms first, second, third, etc. may be used to describe various information in one or more embodiments of the present specification, the information should not be limited to these terms. These terms are only used to distinguish the information of the same type from each other. For example, the first information can also be referred to as the second information, and similarly, the second information can also be referred to as the first information without departing from the scope of one or more embodiments of the present specification. Depending on the context, the word "if" used herein can be explained as "in the case of", "when" or "in response to determine".

The previous descriptions are preferred embodiments of one or more embodiments of the present specification, and are not intended to limit one or more embodiments of the present specification. Any modification, equivalent replacement, or improvement made without departing from the spirit and principle of one or more embodiments of the present specification shall fall within the scope of the claims in one or more embodiments of the present specification.

What is claimed is:

1. A computer-implemented method, comprising:
in response to determining that bytecodes of a smart contract are deployed on a first blockchain node in a blockchain network, starting, by the first blockchain node, to compile the bytecodes of the smart contract into machine codes of the smart contract through a Just-In-Time (JIT) compiler;
receiving, by the first blockchain node, a request that invokes the smart contract;
determining, by the first blockchain node, i) that the machine codes of the smart contract are not locally stored and ii) that execution results of the machine codes of the smart contract and execution results of the bytecodes of the smart contract are of consistency, wherein the consistency comprises at least one of: consistency of returned contract execution results, consistency of formed contract storages, or consistency of consumed blockchain assets, wherein determining that the machine codes of the smart contract are not locally stored comprises determining that JIT compilation on the bytecodes of the smart contract is not completed; and
in response to the determining, performing, by the first blockchain node, interpretation execution on the bytecodes of the smart contract.

2. The computer-implemented method of claim 1, wherein before starting, by the first blockchain node, to compile the bytecodes of the smart contract into the machine codes of the smart contract through the JIT compiler, the computer-implemented method further comprises:
receiving, by the first blockchain node, a request for creating the smart contract, wherein the request comprises the bytecodes of the smart contract; and
deploying, by the first blockchain node, the smart contract.

3. The computer-implemented method of claim 1, wherein starting, by the first blockchain node, to compile the bytecodes of the smart contract into the machine codes of the smart contract through the JIT compiler comprises:
starting, by the first blockchain node, to perform the JIT compilation on the bytecodes of the smart contract after completing creation of the smart contract; or
performing, by the first blockchain node, the JIT compilation on the bytecodes of the smart contract in a time period when a service load of the first blockchain node is less than a threshold; or
performing, by the first blockchain node, the JIT compilation on the bytecodes of the smart contract after receiving a transaction request for invoking the smart contract.

4. The computer-implemented method of claim 1, wherein compiling the bytecodes of the smart contract into the machine codes of the smart contract through the JIT compiler comprises: in a process of interpreting or executing the bytecodes of the smart contract,
identifying hotspot bytecodes, wherein the hotspot bytecodes comprise bytecodes with an execution frequency higher than a threshold, and performing compilation based on the hotspot bytecodes; or
performing an optimization of compilation on the bytecodes of the smart contract.

5. The computer-implemented method of claim 4, wherein a granularity of the hotspot bytecodes comprises a function level or a code block level.

6. The computer-implemented method of claim 1, wherein performing, by the first blockchain node, the interpretation execution on the bytecodes of the smart contract comprises:
performing, by the first blockchain node, the interpretation execution on the bytecodes of the smart contract corresponding to an invoked function in the smart contract.

7. The method according to claim 1, wherein determining, by the first blockchain node, that the machine codes of the smart contract are not locally stored and that execution results of the machine codes of the smart contract and the bytecodes of the smart contract are of consistency; and in response to the determining, performing, by the first blockchain node, the interpretation execution on the bytecodes of the smart contract comprises:
in response to determining that the machine codes of the smart contract are not locally stored, further querying, by the first blockchain node, a current status of JIT compilation on the bytecodes of the smart contract; and
in response to determining that the current status of the JIT compilation is in progress and that execution results of the machine codes of the smart contract and the bytecodes of the smart contract are of consistency, performing, by the first blockchain node the interpretation execution on the bytecodes of the smart contract.

8. The computer-implemented method of claim 1, wherein determining, by the first blockchain node, that the machine codes of the smart contract are not locally stored and that execution results of the machine codes of the smart contract and the bytecodes of the smart contract are of consistency; and in response to the determining, performing, by the first blockchain node, the interpretation execution on the bytecodes of the smart contract comprises:
   in response to determining that the machine codes of the smart contract are not locally stored, further querying, by the first blockchain node, a current status of JIT compilation on the bytecodes of the smart contract; and
   in response to determining that the current status of the JIT compilation is not started and that execution results of the machine codes of the smart contract and the bytecodes of the smart contract are of consistency, starting the JIT compilation and performing the interpretation execution on the bytecodes of the smart contract.

9. The method according to claim 1, wherein determining, by the first blockchain node, that the execution results of the machine codes of the smart contract and the bytecodes of the smart contract are of consistency comprises:
   comparing, by the first blockchain node, test results of the machine codes of the smart contract and the bytecodes of the smart contract in at least one verification scenario, wherein the test results indicates that the execution results of the machine codes of the smart contract and the bytecodes of the smart contract are of consistency; or
   performing, by the first blockchain node, formal verification for the machine codes of the smart contract and the bytecodes of the smart contract, wherein consistency of verification results indicates that the execution results of the machine codes of the smart contract and the bytecodes of the smart contract are of consistency.

10. The computer-implemented method of claim 1, further comprising storing, by the first blockchain node, the machine codes of the smart contract locally, wherein storing, by the first blockchain node, the machine codes of the smart contract locally comprises caching by the first blockchain node, the machine codes of the smart contract locally.

11. The computer-implemented method of claim 1, further comprising:
   in response to determining that the bytecodes of the smart contract are deployed on a second blockchain node in the blockchain network, starting, by the second blockchain node, to compile the bytecodes of the smart contract into machine codes of the smart contracts through the JIT compiler;
   storing, by the second blockchain node, the machine codes of the smart contract locally;
   determining, by the second blockchain node, that the machine codes of the smart contract are locally stored; and
   executing, by the second blockchain node, the machine codes of the smart contract.

12. The computer-implemented method of claim 11, wherein before starting, by the second blockchain node, to compile the bytecodes of the smart contract into the machine codes of the smart contracts through the JIT compiler, the computer-implemented method further comprises:
   receiving, by the second blockchain node, a request for creating the smart contract, wherein the request comprises the bytecodes of the smart contract; and
   deploying, by the second blockchain node, the smart contract.

13. The computer-implemented method of claim 11, wherein executing, by the second blockchain node, the machine codes of the smart contract comprises:
   executing, by the second blockchain node, the machine codes of the smart contract that are locally stored by the second blockchain node corresponding to an invoked function or code block in the smart contract.

14. A non-transitory, computer-readable medium storing one or more instructions executable by a computer system to perform operations comprising:
   in response to determining that bytecodes of a smart contract are deployed on a first blockchain node in a blockchain network, starting, by the first blockchain node, to compile the bytecodes of the smart contract into machine codes of the smart contract through a Just-In-Time (JIT) compiler;
   receiving, by the first blockchain node, a request that invokes the smart contract;
   determining, by the first blockchain node, i) that the machine codes of the smart contract are not locally stored and ii) that execution results of the machine codes of the smart contract and execution results of the bytecodes of the smart contract are consistent, of consistency, wherein the consistency comprises at least one of: consistency of returned contract execution results, consistency of formed contract storages, or consistency of consumed blockchain assets, wherein determining that the machine codes of the smart contract are not locally stored comprises determining that JIT compilation on the bytecodes of the smart contract is not completed; and
   in response to the determining, performing, by the first blockchain node, interpretation execution on the bytecodes of the smart contract.

15. The non-transitory, computer-readable medium of claim 14, wherein before starting, by the first blockchain node, to compile the bytecodes of the smart contract into the machine codes of the smart contract through the JIT compiler, the operations further comprise:
   receiving, by the first blockchain node, a request for creating the smart contract, wherein the request comprises the bytecodes of the smart contract; and
   deploying, by the first blockchain node, the smart contract.

16. The non-transitory, computer-readable medium of claim 14, wherein starting, by the first blockchain node, to compile the bytecodes of the smart contract into the machine codes of the smart contract through the JIT compiler comprises:
   starting, by the first blockchain node, to perform the JIT compilation on the bytecodes of the smart contract after completing creation of the smart contract; or
   performing, by the first blockchain node, the JIT compilation on the bytecodes of the smart contract in a time period when a service load of the first blockchain node is less than a threshold; or
   performing, by the first blockchain node, the JIT compilation on the bytecodes of the smart contract after receiving a transaction request for invoking the smart contract.

17. The non-transitory, computer-readable medium of claim 14, wherein compiling the bytecodes of the smart contract into the machine codes of the smart contract through the JIT compiler comprises: in a process of interpreting or executing the bytecodes of the smart contract, identifying hotspot bytecodes, wherein the hotspot bytecodes comprise bytecodes with an execution frequency higher than a threshold, and performing compilation based on the hotspot bytecodes; or performing an optimization of compilation on the bytecodes of the smart contract.

18. The non-transitory, computer-readable medium of claim 14, wherein the operations further comprise:

in response to determining that the bytecodes of the smart contract are deployed on a second blockchain node in the blockchain network, starting, by the second blockchain node, to compile the bytecodes of the smart contract into machine codes of the smart contracts through the JIT compiler;

storing, by the second blockchain node, the machine codes of the smart contract locally;

determining, by the second blockchain node, that the machine codes of the smart contract are locally stored; and executing, by the second blockchain node, the machine codes of the smart contract.

19. The non-transitory, computer-readable medium of claim 18, wherein before starting, by the second blockchain node, to compile the bytecodes of the smart contract into the machine codes of the smart contracts through the JIT compiler, the operations further comprise:

receiving, by the second blockchain node, a request for creating the smart contract, wherein the request comprises the bytecodes of the smart contract; and deploying, by the second blockchain node, the smart contract.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

in response to determining that bytecodes of a smart contract are deployed on a first blockchain node in a blockchain network, starting, by the first blockchain node, to compile the bytecodes of the smart contract into machine codes of the smart contract through a Just-In-Time (JIT) compiler;

receiving, by the first blockchain node, a request that invokes the smart contract;

determining, by the first blockchain node, i) that the machine codes of the smart contract are not locally stored and ii) that execution results of the machine codes of the smart contract and execution results of the bytecodes of the smart contract are of consistency, wherein the consistency comprises at least one of: consistency of returned contract execution results, consistency of formed contract storages, or consistency of consumed blockchain assets, wherein determining that the machine codes of the smart contract are not locally stored comprises determining that JIT compilation on the bytecodes of the smart contract is not completed; and in response to the determining, performing, by the first blockchain node, interpretation execution on the bytecodes of the smart contract.

21. The computer-implemented system of claim 20, wherein before starting, by the first blockchain node, to compile the bytecodes of the smart contract into the machine codes of the smart contract through the JIT compiler, the one or more operations further comprise:

receiving, by the first blockchain node, a request for creating the smart contract, wherein the request comprises the bytecodes of the smart contract; and deploying, by the first blockchain node, the smart contract.

22. The computer-implemented system of claim 20, wherein starting, by the first blockchain node, to compile the bytecodes of the smart contract into the machine codes of the smart contract through the JIT compiler comprises:

starting, by the first blockchain node, to perform the JIT compilation on the bytecodes of the smart contract after completing creation of the smart contract; or performing, by the first blockchain node, the JIT compilation on the bytecodes of the smart contract in a time period when a service load of the first blockchain node is less than a threshold; or performing, by the first blockchain node, the JIT compilation on the bytecodes of the smart contract after receiving a transaction request for invoking the smart contract.

23. The computer-implemented system of claim 20, wherein compiling the bytecodes of the smart contract into the machine codes of the smart contract through the JIT compiler comprises: in a process of interpreting or executing the bytecodes of the smart contract, identifying hotspot bytecodes, wherein the hotspot bytecodes comprise bytecodes with an execution frequency higher than a threshold, and performing compilation based on the hotspot bytecodes; or performing an optimization of compilation on the bytecodes of the smart contract.

24. The computer-implemented system of claim 20, wherein the one or more operations further comprise:

in response to determining that the bytecodes of the smart contract are deployed on a second blockchain node in the blockchain network, starting, by the second blockchain node, to compile the bytecodes of the smart contract into machine codes of the smart contracts through the JIT compiler;

storing, by the second blockchain node, the machine codes of the smart contract locally;

determining, by the second blockchain node, that the machine codes of the smart contract are locally stored; and executing, by the second blockchain node, the machine codes of the smart contract.

25. The computer-implemented system of claim 24, wherein the one or more operations further comprise:

receiving, by the second blockchain node, a request for creating the smart contract, wherein the request comprises the bytecodes of the smart contract; and deploying, by the second blockchain node, the smart contract.

* * * * *

UNITED STATES PATENT AND TRADEMARK OFFICE
CERTIFICATE OF CORRECTION

PATENT NO. : 11,416,272 B2
APPLICATION NO. : 17/362921
DATED : August 16, 2022
INVENTOR(S) : Qi Liu and Xuepeng Guo It is certified that error appears in the above-identified patent and that said Letters Patent is hereby corrected as shown below:

On the Title Page

In Item (73), delete "Ltd." and insert -- Ltd., Zhejiang (CN) --, therefor.

In the Claims

In Column 24, Line 25, Claim 14, delete "are consistent, of" and insert -- are of --, therefor.

Signed and Sealed this
Twenty-first Day of February, 2023

Katherine Kelly Vidal
*Director of the United States Patent and Trademark Office*